(12) United States Patent
Skuci et al.

(10) Patent No.: US 12,444,912 B2
(45) Date of Patent: Oct. 14, 2025

(54) MEDIUM VOLTAGE SWITCHGEAR DISCONNECTOR SYSTEM

(71) Applicant: ABB Schweiz AG, Baden (CH)

(72) Inventors: Michal Skuci, Brno (CZ); Josef Cernohous, Jamne nad Orlici (CZ); Radek Javora, Hrusovany u Brna (CZ); Tomas Kozel, Brno (CZ)

(73) Assignee: ABB Schweiz AG, Baden (CH)

( * ) Notice: Subject to any disclaimer, the term of this patent is extended or adjusted under 35 U.S.C. 154(b) by 215 days.

(21) Appl. No.: 18/320,560

(22) Filed: May 19, 2023

(65) Prior Publication Data
US 2023/0378727 A1    Nov. 23, 2023

(30) Foreign Application Priority Data
May 20, 2022   (EP) ..................... 22174652

(51) Int. Cl.
*H02B 13/025*    (2006.01)
*H02B 1/22*      (2006.01)
*H02B 11/127*    (2006.01)

(52) U.S. Cl.
CPC ............. *H02B 13/025* (2013.01); *H02B 1/22* (2013.01); *H02B 11/127* (2013.01)

(58) Field of Classification Search
CPC ............... H01H 9/06; H01H 2009/066; H01H 2071/046; H02B 1/36
USPC ................................................ 361/2
See application file for complete search history.

(56) References Cited

U.S. PATENT DOCUMENTS

| 7,777,150 B2 | 8/2010 | Vaghini et al. |
| 2007/0261946 A1 * | 11/2007 | Yu .......................... H01H 3/264 |
| | | 200/48 R |

FOREIGN PATENT DOCUMENTS

| DE | 102008033495 B4 * | 4/2010 | ........... H02B 13/005 |
| EP | 3336870 A1 | 6/2018 | |
| EP | 3671789 A1 * | 6/2020 | ........... H01H 31/003 |
| JP | 2-288118 A | 11/1990 | |
| JP | 2002051416 A * | 2/2002 | |

OTHER PUBLICATIONS

Z.-h. Zhu, D.-I. Yuan, H.-y. Wang, X. Fei, F. Yang and M. Ma, "Research and design of an innovative medium voltage removable metal-enclosed switchgear," 2017 4th International Conference on Electric Power Equipment—Switching Technology (ICEPE-ST), Xi'an, China, 2017, pp. 702-706 (Year: 2017).*

European Patent Office, Extended European Search Report in European Patent Application No. 22174652.2, 10 pp. (Nov. 18, 2022).

* cited by examiner

*Primary Examiner* — Sreeya Sreevatsa
(74) *Attorney, Agent, or Firm* — Leydig, Voit & Mayer, Ltd.

(57) ABSTRACT

A medium voltage switchgear busbar disconnector system includes a busbar and a disconnector moveable part; wherein the busbar comprises a contact; wherein in a connected state the disconnector moveable part is configured to be connected to the contact; and wherein in a disconnected state the disconnector moveable part is configured to be disconnected from the contact.

18 Claims, 4 Drawing Sheets

# MEDIUM VOLTAGE SWITCHGEAR DISCONNECTOR SYSTEM

CROSS-REFERENCE TO RELATED APPLICATIONS

This patent application claims priority to European Patent Application No. 22174652.2, filed on May 20, 2022, which is incorporated herein in its entirety by reference.

FIELD OF THE DISCLOSURE

The present disclosure generally relates to a medium voltage switchgear disconnector system for a switchgear such as an air-insulated switchgear or a gas-insulated switchgear, and to a busbar for such a switchgear.

BACKGROUND OF THE INVENTION

Today's medium voltage switchgear generally have a number of busbars that distribute power through panels and incoming or outcoming panels with circuit breakers connecting to these busbars through a disconnector. Such a disconnector usually uses flexible contacts mounted on the busbar to connect to them directly or by extension busbar (T-OFF).

Such a disconnector for today's switchgear is shown in FIGS. 1-2, which show a rotational disconnector with contact on a T-OFF. In FIGS. 1-2, "1" represents a busbar, "2" represents a connection bar or T-OFF, "3" represents a contact, and "4" represents a disconnector moving part.

Such a disconnector for today's switchgear is also shown in schematic form in FIG. 3. In the configurations of FIGS. 1-3 additional material is used on the busbar plus additional conducting parts are required in order to connect a switchgear panel current path to the busbars. It results in higher cost and bigger space usage.

Such disconnectors for today's switchgear are also shown in schematic form in FIG. 4, that shows how contacts and disconnectors have been used to make connections to panels. Configuration a) uses a double level of busbar system, where busbars overlap with one connection point, with a disadvantage of different heights of contact or the disadvantage of the same contact but with an additional extension, which leads to higher cost. Configuration b) uses an additional connection bar, which leads to two connection points to connect two panels.

BRIEF SUMMARY OF THE INVENTION

The present disclosure describes an improved mechanism to connect to busbars of a medium voltage switchgear. In a first aspect, there is provided a medium voltage switchgear busbar disconnector system, comprising: a busbar; and a disconnector moveable part; wherein the busbar comprises a contact. In a connected state the disconnector moveable part is configured to be connected to the contact. In a disconnected state the disconnector moveable part is configured to be disconnected from the contact. Thus, the contact of a busbar is not an additional part that is added to a fully functioning busbar, rather the new contact is part of the busbar itself.

BRIEF DESCRIPTION OF THE SEVERAL VIEWS OF THE DRAWING(S)

DETAILED DESCRIPTION OF THE INVENTION

Figure 5:
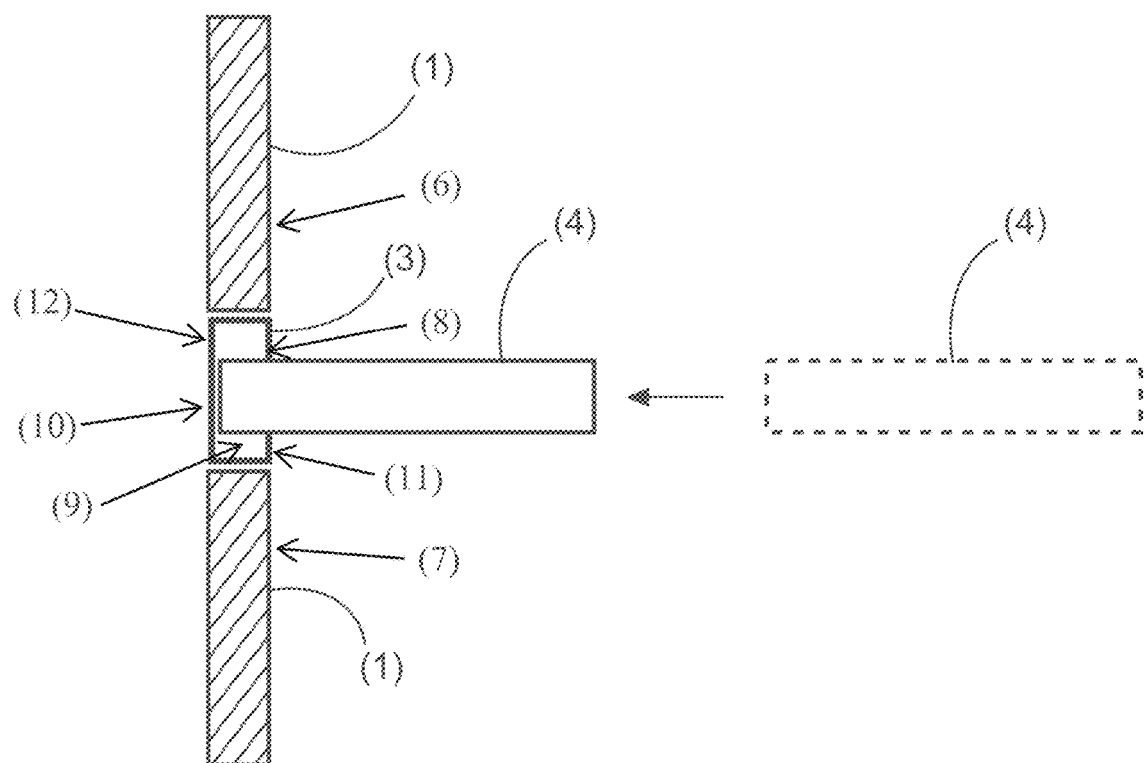
FIG. 5 shows a schematic representation of an example of the new busbar disconnector system in accordance with the disclosure.
Figure 6:
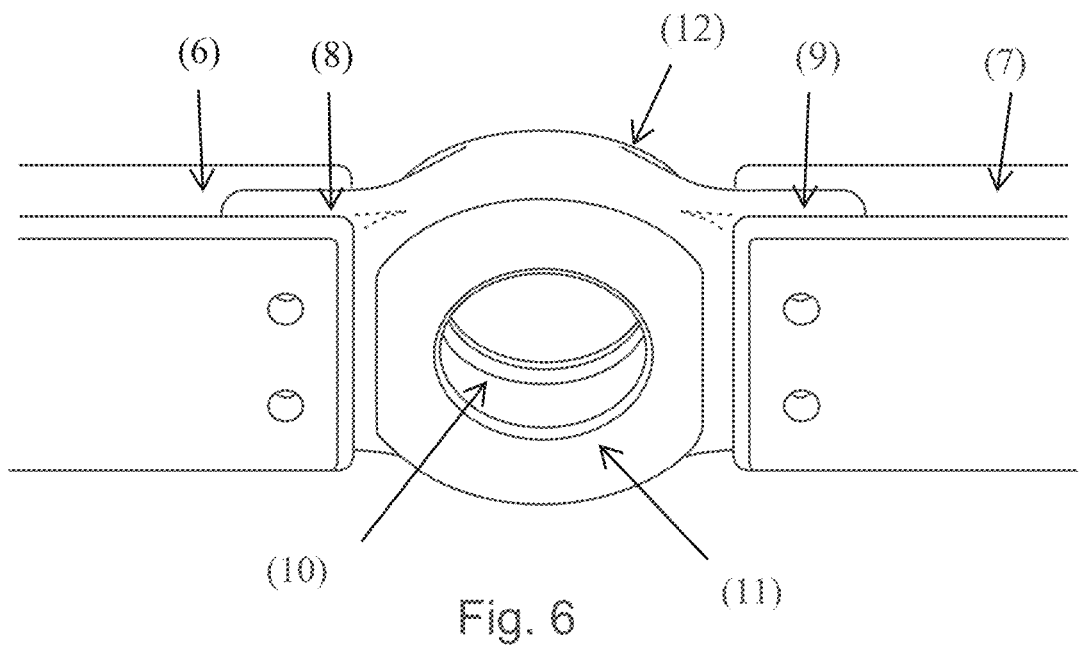
FIG. 6 shows an example of a busbar of the new busbar disconnector system in accordance with the disclosure.
Figure 7:
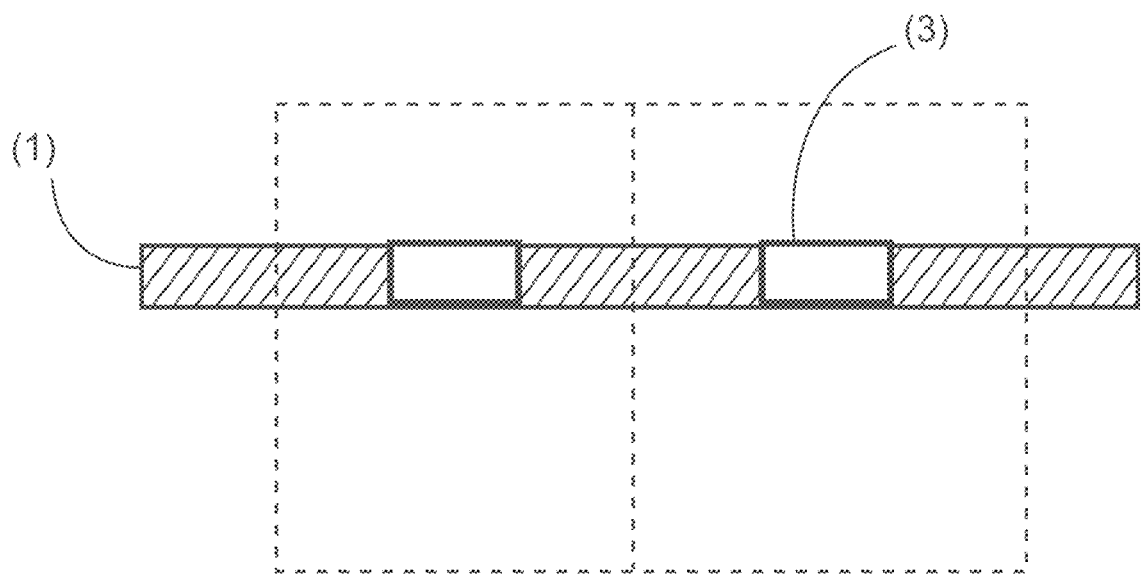
FIG. 7 shows a schematic representation of an example of the new busbar disconnector system in accordance with the disclosure.

FIGS. 5-7 relate to a new busbar disconnector system for a medium voltage switchgear.

In an example, the new medium voltage switchgear busbar disconnector system comprises a busbar 1, and a disconnector moveable part 4. The busbar comprises a contact 3. In a connected state the disconnector moveable part is configured to be connected to the contact. In a disconnected state the disconnector moveable part is configured to be disconnected from the contact.

According to an example, the busbar comprises a first part 6 located on a first side 8 of the contact 3 of the busbar 1 and the busbar 1 comprises a second part 7 located on a second side 9 of the contact 4 of the busbar 1.

According to an example, the second side 9 of the contact 3 of the busbar 1 is on an opposite side of the contact 3 of the busbar 1 to the first side 8 of the contact 3 of the busbar 1.

According to an example, in the disconnected state a current path from the first part 6 of the busbar 1 to the second part 7 of the busbar 1 goes through the contact 3 of the busbar 1.

According to an example, in the disconnected state the busbar 1 is configured such that all the current that passes from the first part 6 of the busbar 1 to the second part 7 of the busbar 1 goes through the contact 3 of the busbar 1.

According to an example, the first part 6 of the busbar 1 is not directly connected to the second part 7 of the busbar 1.

According to an example, the first part 6 of the busbar 1 is directly connected to the contact 3 of the busbar 1, and wherein the second part 7 of the busbar 1 is directly connected to the contact 3 of the busbar 1.

In an example, the first part 6 of the busbar 1 is bolted or welded to the contact 3 of the busbar 1, and wherein the second part 7 of the busbar 1 is bolted or welded to the contact 3 of the busbar 1.

This is shown in FIG. 6, where the two side parts of the busbar 1 are connected to the central (contact 3) part of the busbar 1, and if current was to flow along the busbar 1 all the current would have to flow through one side part of the busbar 1, then through the central (contact 3) part of the busbar 1, and then through the other side part of the busbar 1. Thus, the central (contact 3) part of the busbar 1 forms part of the busbar 1 and act as a contact 3 to connect with and disconnect from a disconnector moveable part 4. This is completely different to current busbar disconnector systems, where the contact is an additional part "added" to an existing busbar that can act as a busbar without the contact. In the new busbar disconnector system, if the contact 3 is removed the remaining parts of the busbar 1 cannot act as a busbar 1 unless they were connected to each other.

According to an example, a transition from the disconnected state to the connected state comprises a first linear movement of the disconnector moveable part 4, wherein a transition from the connected state to the disconnected state comprises a second linear movement of the disconnector moveable part 4. The second linear movement is in an opposite direction to the first linear movement.

According to an example, the contact 3 of the busbar 1 has a hole 10 that extends from a front side 11 of the contact 3 of the busbar 1 to a rear side 12 of the contact 3 of the busbar 1, and the first linear movement of the disconnector moveable part 4 comprises an insertion of the disconnector moveable part 4 into the hole 10 of the contact 4 of the busbar 1 from the front side 11 of the contact 3 of the busbar 1. The second linear movement of the disconnector moveable part 4 comprises an extraction of the disconnector moveable part 4 from the hole 10 of the contact 3 of the busbar 1 out from the front side 11 of the contact 3 of the busbar 1.

According to an example, the first linear movement of the disconnector moveable part 4 comprises an insertion of the disconnector moveable part 4 into the hole 10 of the contact 3 of the busbar 1 from the front side 11 of the contact 3 of the busbar 1 and movement of the disconnector moveable part 4 to the rear side 12 of the contact 3 of the busbar 1. The second linear movement of the disconnector moveable part 4 comprises a movement of the disconnector moveable part 4 away from the rear side 12 of the contact 3 of the busbar 1 and an extraction of the disconnector moveable part 4 from the hole 10 of the contact 3 of the busbar 1 out from the front side 11 of the busbar 1.

According to an example, the hole 10 has at least one circular cross section and the disconnector moveable part 4 comprises a circular cross section that corresponds to a circular cross section of the at least one circular cross section of the hole 10.

According to an example, a front side 11 of the contact 3 of the busbar 1 is coplanar with a front side 11 of the first part 6 of the busbar 1, and the front side 11 of the contact 3 of the busbar 1 is coplanar with a front side 11 of the second part 7 of the busbar 1.

According to an example, a rear side 12 of the contact 3 of the busbar 1 is coplanar with a rear side 12 of the first part 6 of the busbar 1, and wherein the rear of the contact 3 of the busbar 1 is coplanar with a rear side 12 of the second part 7 of the busbar 1.

A switchgear can have such a busbar 1 disconnector system. However, a switchgear can have just the above busbar 1, and later be provided with a disconnector moveable part 4. Thus, in an example busbar 1 for a medium voltage switchgear comprises a contact 3. The busbar 1 is configured to be connected to and disconnected from a disconnector moveable part 4. In a connected state the contact 3 is configured to be connected to the disconnector moveable part 4. In a disconnected state the contact 3 is configured to be disconnected from the disconnector moveable part 4.

In an example, the busbar 1 comprises a first part 6 located on a first side 8 of the contact 3 of the busbar 1 and the busbar 1 comprises a second part 7 located on a second side 9 of the contact 3 of the busbar 1.

In an example, the second side 9 of the contact 3 of the busbar 1 is on an opposite side of the contact 3 of the busbar 1 to the first side 8 of the contact 3 of the busbar 1.

In an example, in the disconnected state a current path from the first part 6 of the busbar 1 to the second part 7 of the busbar 1 goes through the contact 3 of the busbar 1.

In an example, in the disconnected state the busbar 1 is configured such that all the current that passes from the first part 6 of the busbar 1 to the second part 7 of the busbar 1 goes through the contact 3 of the busbar 1.

In an example, the first part 6 of the busbar 1 is not directly connected to the second part 7 of the busbar 1.

In an example, the first part 6 of the busbar 1 is directly connected to the contact 3 of the busbar 1, and wherein the second part 7 of the busbar 1 is directly connected to the contact 3 of the busbar 1.

In an example, the first part 6 of the busbar 1 is bolted or welded to the contact 3 of the busbar 1, and wherein the second part 7 of the busbar 1 is bolted or welded to the contact 3 of the busbar 1.

In an example, for a transition from the disconnected state to the connected state the contact 3 of the busbar 1 is configured to be connected to the disconnector moveable part 4 via a first linear movement of the disconnector moveable part 4. For a transition from the connected state to the disconnected state the contact 3 of the busbar 1 is configured to be disconnected from the disconnector moveable part 4 via a second linear movement of the disconnector moveable part 4, and wherein the second linear movement is in an opposite direction to the first linear movement.

In an example, the contact 3 of the busbar 1 has a hole 10 that extends from a front side 11 of the contact 3 of the busbar 1 to a rear side 12 of the contact 3 of the busbar 1. For the transition from the disconnected state to the connected state the contact 3 of the busbar 1 is configured to be connected to the disconnector moveable part 4 via the first linear movement of the disconnector moveable part 4 leading to an insertion of the disconnector moveable part 4 into the hole 10 of the contact 3 of the busbar 1 from the front side 11 of the contact 3 of the busbar 1. For the transition from the connected state to the disconnected state the contact 3 of the busbar 1 is configured to be disconnected from the disconnector moveable part 4 via the second linear movement of the disconnector moveable part 4 leading to an extraction of the disconnector moveable part 4 from the hole 10 of the contact 3 of the busbar 1 out from the front side 9 of the contact 3 of the busbar 1.

In an example, for the transition from the disconnected state to the connected state the contact 3 of the busbar 1 is configured to be connected to the disconnector moveable part 4 via the first linear movement of the disconnector moveable part 4 leading to an insertion of the disconnector moveable part 4 into the hole 10 of the contact 3 of the busbar 1 from the front side 11 of the contact 3 of the busbar 1 and movement of the disconnector moveable part 4 to the rear side 12 of the contact 3 of the busbar 1. For the transition from the connected state to the disconnected state the contact 3 of the busbar 1 is configured to be disconnected from the disconnector moveable part 4 via the second linear movement of the disconnector moveable part 4 leading to a movement of the disconnector moveable part 4 away from the rear side 12 of the contact 3 of the busbar 1 and an extraction of the disconnector moveable part 4 from the hole 10 of the contact 3 of the busbar 1 out from the front side 11 of the busbar 1.

In an example, the hole 10 has at least one circular cross section and wherein a circular cross section of the at least one circular cross section of the hole 10 corresponds to a circular cross section of the disconnector moveable part 4.

In an example, a front side 11 of the contact 3 of the busbar 1 is coplanar with a front side 11 of the first part 6 of the busbar 1, and the front side 11 of the contact 3 of the busbar 1 is coplanar with a front side 11 of the second part 7 of the busbar 1.

In an example, a rear side 12 of the contact 3 of the busbar 1 is coplanar with a rear side 12 of the first part 6 of the busbar 1, and the rear of the contact 3 of the busbar 1 is coplanar with a rear side 12 of the second part 7 of the busbar 1.

From the above it is clear that a switchgear can comprise one or more busbar 1 disconnector systems as described above; and/or comprise one or more busbars 1 as described above.

Continuing with FIGS. 5-7, several embodiments are now described in detail.

As shown in FIG. 5, which shows a linear type of the new busbar 1 disconnector system, the new contact 3 combines a function of contact 3 and busbar 1 in one. It replaces part of the busbar 1 and takes its function of distributing power to other panels and enables a panel where it is situated to be connected to the busbars 1 by a disconnector moving part 4.

FIG. 6 shows in detail the contact 3 part of the busbar 1 that forms part of the busbar 1 itself.

Figure 1:
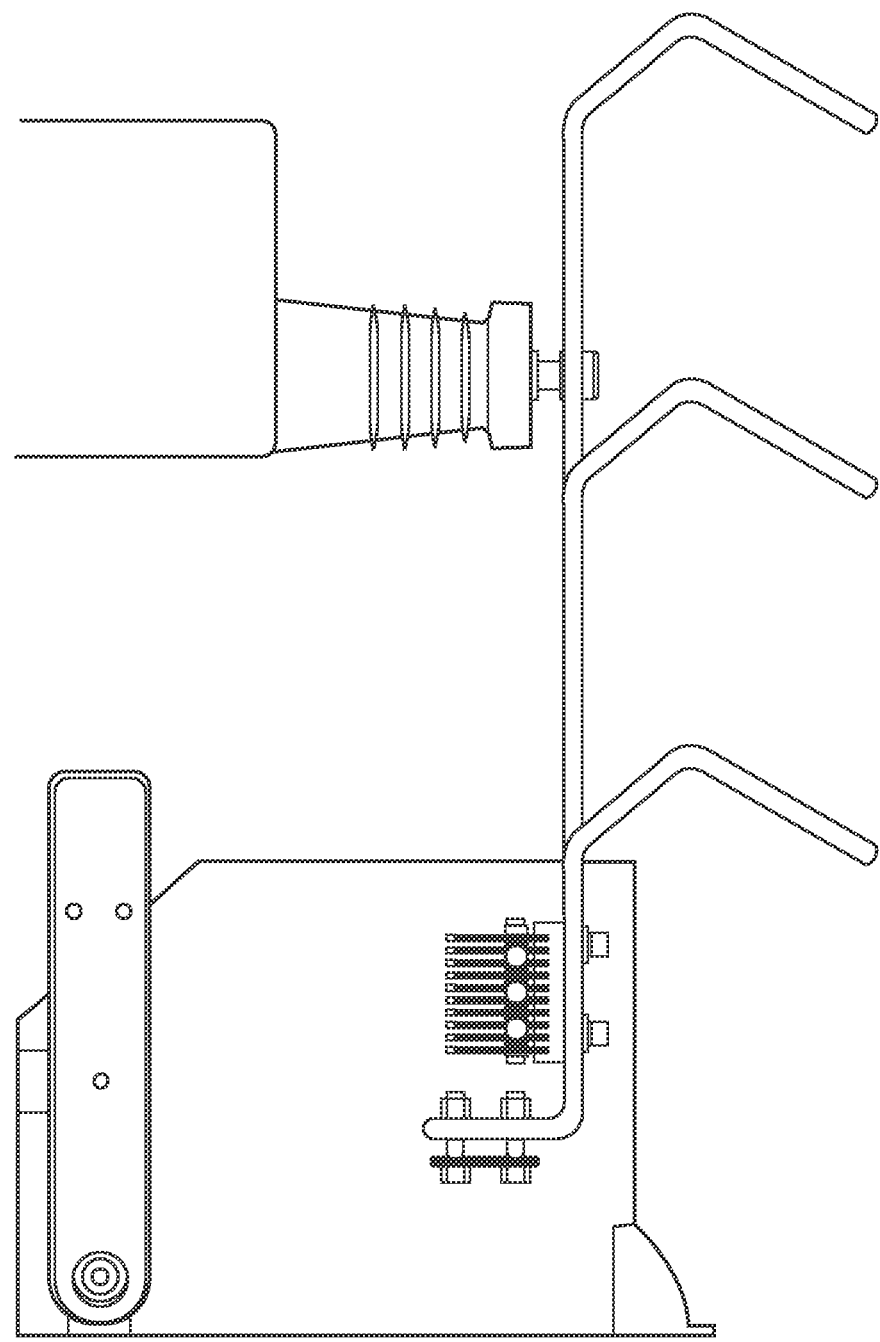
FIGS. 1 and 2 show an example of a known busbar disconnector system with a contact on a T-OFF, in accordance with the prior art.
Figure 2:
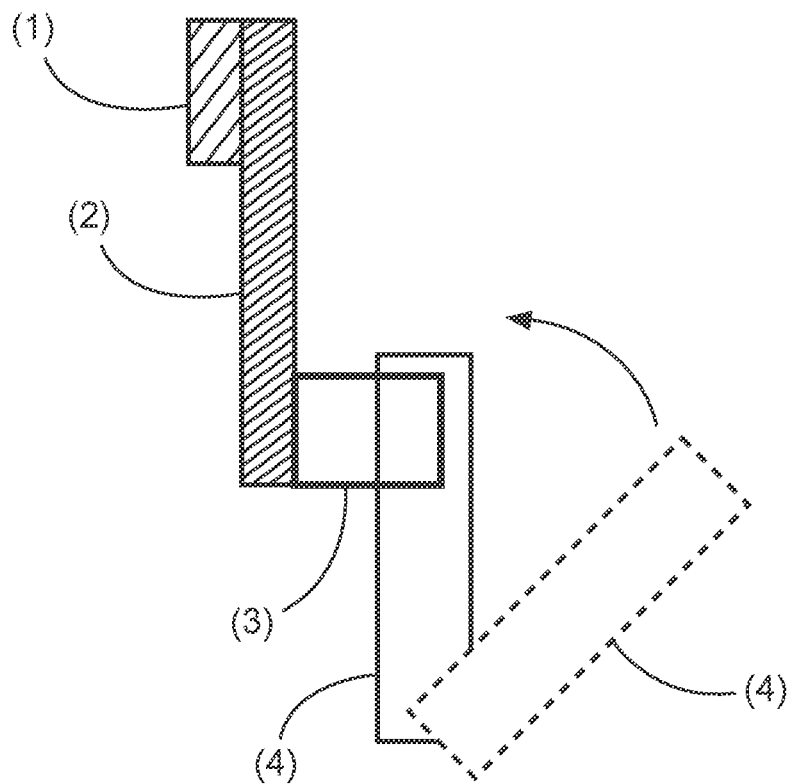
Figure 3:
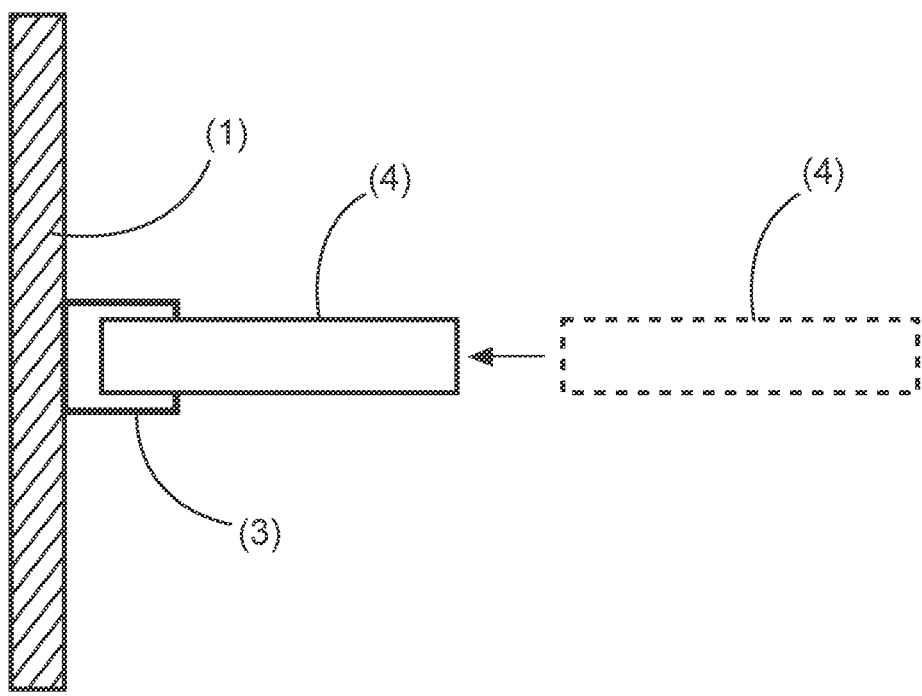
FIG. 3 shows a schematic representation of an example of a known busbar disconnector system in accordance with the prior art.
Figure 4:
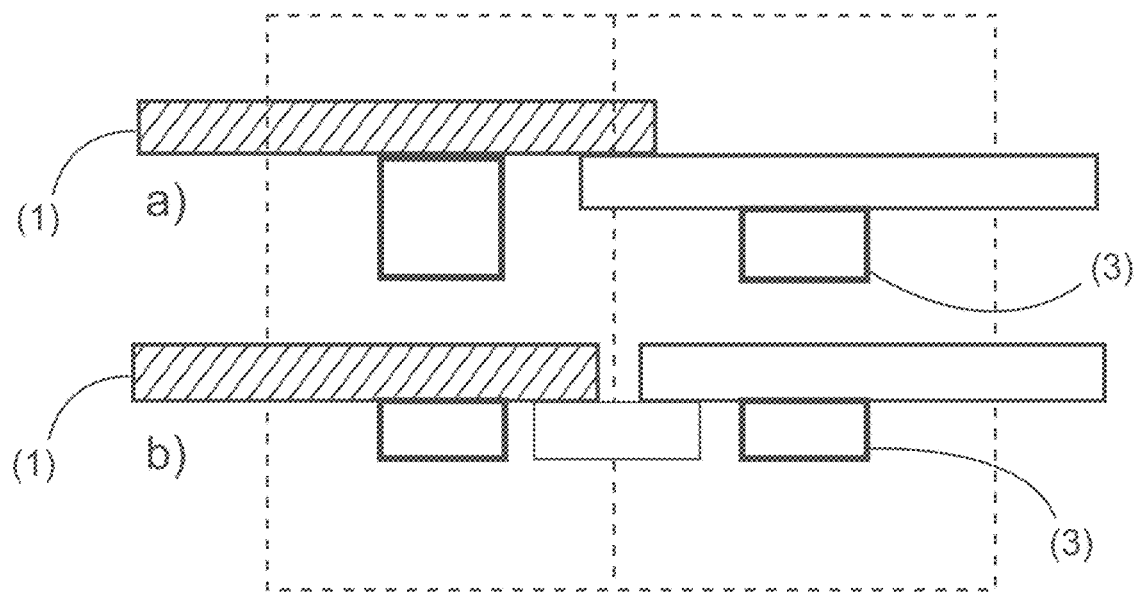
FIG. 4 shows schematic representations of examples of a known busbar disconnector system in accordance with the prior art.

FIG. 7 shows a schematic representation of an example of the new busbar 1 disconnector system shows the new contact 3 used in the busbar 1 disconnector system connecting more panels without any unnecessary material used and being the most space efficient. This can be contrasted with the configurations a and b of existing system, shown in FIG. 4. In configuration a) of FIG. 4 the double level of busbars 1 uses additional material on the busbar 1 and contact leading to higher production cost and space inefficiency. In configuration b) of FIG. 4 this also leads to higher production cost space requirements by using additional material behind the contact 3.

Advantages of the new busbar 1 disconnector system and the busbar 1 with the new contact 3 part are:
  Less space needed especially in linear arrangement of a disconnector;
  Less conductive material needed in total because new contact 3 replaces part of the busbar 1;
  Combining two functions in one does not compromise the manufacturability nor assembling complexity.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In an example, the busbar 1 comprises a first part 6 located on a first side 8 of the contact 3 of the busbar 1 and the busbar 1 comprises a second part 7 located on a second side 9 of the contact 3 of the busbar 1.

In an example, the second side 9 of the contact 3 of the busbar 1 is on an opposite side of the contact 3 of the busbar 1 to the first side 8 of the contact 3 of the busbar 1.

In an example, in the disconnected state a current path from the first part 6 of the busbar 1 to the second part 7 of the busbar 1 goes through the contact 3 of the busbar 1.

In an example, in the disconnected state the busbar 1 is configured such that all the current that passes from the first part 6 of the busbar 1 to the second part 7 of the busbar 1 goes through the contact 3 of the busbar 1.

In an example, the first part 6 of the busbar 1 is not directly connected to the second part 7 of the busbar 1.

In an example, the first part 6 of the busbar 1 is directly connected to the contact 3 of the busbar 1, and wherein the second part 7 of the busbar 1 is directly connected to the contact 3 of the busbar 1.

In an example, a transition from the disconnected state to the connected state comprises a first linear movement of the disconnector moveable part 4, and a transition from the connected state to the disconnected state comprises a second linear movement of the disconnector moveable part 4. The second linear movement is in an opposite direction to the first linear movement.

In an example, the contact 3 of the busbar 1 has a hole 10 that extends from a front side 11 of the contact 3 of the busbar 1 to a rear side 12 of the contact 3 of the busbar 1. The first linear movement of the disconnector moveable part 4 comprises an insertion of the disconnector moveable part 4 into the hole 10 of the contact 3 of the busbar 1 from the front side 11 of the contact 3 of the busbar 1. The second linear movement of the disconnector moveable part 4 comprises an extraction of the disconnector moveable part 4 from the hole 10 of the contact 3 of the busbar 1 out from the front side 11 of the contact 3 of the busbar 1.

In an example, the first linear movement of the disconnector moveable part 4 comprises an insertion of the disconnector moveable part 4 into the hole 10 of the contact 3 of the busbar 1 from the front side 11 of the contact 3 of the busbar 1 and movement of the disconnector moveable part 4 to the rear side 12 of the contact 3 of the busbar 1. The second linear movement of the disconnector moveable part 4 comprises a movement of the disconnector moveable part 4 away from the rear side 12 of the contact 3 of the busbar 1 and an extraction of the disconnector moveable part 4 from the hole 10 of the contact 3 of the busbar 1 out from the front side 11 of the busbar 1.

In an example, the hole 10 has at least one circular cross section and the disconnector moveable part 4 comprises a circular cross section that corresponds to a circular cross section of the at least one circular cross section of the hole 10.

In an example, the front side 11 of the contact 3 of the busbar 1 is coplanar with the front side 11 of the first part 6 of the busbar 1, and the front side 11 of the contact 3 of the busbar 1 is coplanar with the front side 11 of the second part 7 of the busbar 1.

In an example, the rear side 12 of the contact 3 of the busbar 1 is coplanar with the rear side 12 of the first part 6 of the busbar 1, and the rear of the contact 3 of the busbar 1 is coplanar with the rear side 12 of the second part 7 of the busbar 1.

In a second aspect, there is provided a busbar 1 for a medium voltage switchgear, the busbar 1 comprising a contact 3. The busbar 1 is configured to be connected to and disconnected from a disconnector moveable part 4. In a connected state the contact 3 of the busbar 1 is configured to be connected to the disconnector moveable part 4. In a disconnected state the contact 3 of the busbar 1 is configured to be disconnected from the disconnector moveable part 4.

In a third aspect, there is provided a switchgear comprising one or more busbar 1 disconnector systems according to the first aspect; and/or comprising one or more busbars 1 according to the second aspect.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A switchgear busbar disconnector system for a medium voltage application, comprising:
   a busbar; and
   a disconnector moveable part;
   wherein the busbar comprises a contact, a first part located on a first side of the contact of the busbar, and a second part located on a second side of the contact of the bus bar;
   wherein in a connected state the disconnector moveable part is configured to be connected to the contact; and
   wherein in a disconnected state the disconnector moveable part is configured to be disconnected from the contact and the busbar is configured such that all the current passes from the first part of the busbar to the second part of the busbar goes through the contact of the busbar.

2. The switchgear busbar disconnector system according to claim 1, wherein the second side of the contact of the busbar is on an opposite side of the contact of the busbar to the first side of the contact of the busbar.

3. The switchgear busbar disconnector system according to claim 1, wherein in the disconnected state a current path from the first part of the busbar to the second part of the busbar goes through the contact of the busbar.

4. The switchgear busbar disconnector system according to claim 1, wherein the first part of the busbar is not directly connected to the second part of the busbar.

5. The switchgear busbar disconnector system according to claim 1, wherein the first part of the busbar is directly connected to the contact of the busbar, and wherein the second part of the busbar is directly connected to the contact of the busbar.

6. The switchgear busbar disconnector system according to claim 1, wherein a transition from the disconnected state to the connected state comprises a first linear movement of the disconnector moveable part, wherein a transition from the connected state to the disconnected state comprises a second linear movement of the disconnector moveable part, and wherein the second linear movement is in an opposite direction to the first linear movement.

7. The switchgear busbar disconnector system according to claim 6, wherein the contact of the busbar has a hole that extends from a front side of the contact of the busbar to a rear side of the contact of the busbar, and wherein the first linear movement of the disconnector moveable part comprises an insertion of the disconnector moveable part into the hole of the contact of the busbar from the front side of the contact of the busbar.

8. The switchgear busbar disconnector system according to claim 7, wherein the second linear movement of the disconnector moveable part comprises an extraction of the disconnector moveable part from the hole of the contact of the busbar out from the front side of the contact of the busbar.

9. The switchgear busbar disconnector system according to claim 7, wherein the hole has at least one circular cross section and wherein the disconnector moveable part comprises a circular cross section that corresponds to a circular cross section of the at least one circular cross section of the hole.

10. The switchgear busbar disconnector system according to claim 6, wherein the first linear movement of the disconnector moveable part comprises an insertion of the disconnector moveable part into a hole of the contact of the busbar from a front side of the contact of the busbar and movement of the disconnector moveable part to a rear side of the contact of the busbar.

11. The switchgear busbar disconnector system according to claim 10, wherein the second linear movement of the disconnector moveable part comprises a movement of the disconnector moveable part away from the rear side of the contact of the busbar and an extraction of the disconnector moveable part from the hole of the contact of the busbar out from the front side of the busbar.

12. A switchgear busbar disconnector system comprising:
    a busbar; and
    a disconnector moveable part;
    wherein the busbar comprises a contact, a first part located on a first side of the contact of the busbar, and a second part located on a second side of the contact of the bus bar;
    wherein in a connected state the disconnector moveable part is configured to be connected to the contact; and
    wherein in a disconnected state the disconnector moveable part is configured to be disconnected from the contact; and wherein a front side of the contact of the busbar is coplanar with a front side of the first part of the busbar, and wherein the front side of the contact of the busbar is coplanar with a front side of the second part of the busbar.

13. A switchgear busbar disconnector system comprising:
a busbar; and
a disconnector moveable part;
wherein the busbar comprises a contact, a first part located on a first side of the contact of the busbar, and a second part located on a second side of the contact of the bus bar;
wherein in a connected state the disconnector moveable part is configured to be connected to the contact; and
wherein in a disconnected state the disconnector moveable part is configured to be disconnected from the contact; and
wherein a rear side of the contact of the busbar is coplanar with a rear side of the first part of the busbar, and wherein the rear of the contact of the busbar is coplanar with a rear side of the second part of the busbar.

14. A busbar for a medium voltage switchgear, comprising:
a contact, a first part located on a first side of the contact of the busbar and a second part located on a second side of the contact of the busbar;
wherein the busbar is configured to be connected to and disconnected from a disconnector moveable part;
wherein in a connected state the contact is configured to be connected to the disconnector moveable part; and
wherein in a disconnected state the contact is configured to be disconnected from the disconnector moveable part and the busbar is configured such that all the current that passes from the first part of the busbar to the second part of the busbar goes through the contact of the busbar.

15. The busbar according to claim 14, wherein the second side of the contact of the busbar is on an opposite side of the contact of the busbar to the first side of the contact of the busbar.

16. The busbar according to claim 14, wherein in the disconnected state a current path from the first part of the busbar to the second part of the busbar goes through the contact of the busbar.

17. A busbar for a medium voltage switchgear, comprising:
a contact, a first part located on a first side of the contact of the busbar and a second part located on a second side of the contact of the busbar;
wherein the busbar is configured to be connected to and disconnected from a disconnector moveable part;
wherein in a connected state the contact is configured to be connected to the disconnector moveable part;
wherein in a disconnected state the contact is configured to be disconnected from the disconnector moveable part; and
wherein a front side of the contact of the busbar is coplanar with a front side of the first part of the busbar, and wherein the front side of the contact of the busbar is coplanar with a front side of the second part of the busbar.

18. A busbar for a medium voltage switch gear, comprising:
a contact, a first part located on a first side of the contact of the busbar and a second part located on a second side of the contact of the busbar;
wherein the busbar is configured to be connected to and disconnected from a disconnector moveable part;
wherein in a connected state the contact is configured to be connected to the disconnector moveable part;
wherein in a disconnected state the contact is configured to be disconnected from the disconnector moveable part; and
wherein a rear side of the contact of the busbar is coplanar with a rear side of the first part of the busbar, and wherein the rear of the contact of the busbar is coplanar with a rear side of the second part of the busbar.

* * * * *